(12) United States Patent
Nghiem et al.

(10) Patent No.: US 8,401,793 B2
(45) Date of Patent: Mar. 19, 2013

(54) HIGH RESOLUTION WIND MEASUREMENTS FOR OFFSHORE WIND ENERGY DEVELOPMENT

(75) Inventors: Son Van Nghiem, Arcadia, CA (US); Gregory Neumann, La Verne, CA (US)

(73) Assignee: California Institute of Technology, Pasadena, CA (US)

( * ) Notice: Subject to any disclaimer, the term of this patent is extended or adjusted under 35 U.S.C. 154(b) by 266 days.

(21) Appl. No.: 12/770,443

(22) Filed: Apr. 29, 2010

(65) Prior Publication Data

US 2010/0280756 A1 Nov. 4, 2010

Related U.S. Application Data

(60) Provisional application No. 61/173,916, filed on Apr. 29, 2009.

(51) Int. Cl.
*G01W 1/00* (2006.01)
*G06F 7/60* (2006.01)
*G01C 5/00* (2006.01)
*G01S 13/00* (2006.01)

(52) U.S. Cl. ............ 702/3; 703/2; 73/170.29; 342/26 A

(58) Field of Classification Search ............. 702/3, 1–2, 702/81, 84, 179, 181–183, 189–190, 199; 703/2, 5; 345/418, 581, 589, 619, 621, 629–630; 73/170.16, 170.29; 342/26 A, 26 R, 147, 342/158
See application file for complete search history.

(56) References Cited

U.S. PATENT DOCUMENTS

2002/0036766 A1 3/2002 Krawczyk et al.

FOREIGN PATENT DOCUMENTS

| JP | 2006-258568 | | 9/2006 |
|---|---|---|---|
| JP | 2006258568 A | * | 9/2006 |

OTHER PUBLICATIONS

Ashcraft et al., The Spatial Response Function of SeaWinds Backscatter Measurements, 2003, Proceedings of SPIE, vol. 5151, Earth Observing Systems VIII, pp. 609-618.*
Carswell et al., Airborne Scatterometers: Investigating Ocean Backscatter Under Low- and High-Wind Conditions, Dec. 1994, Proceedings of the IEEE, vol. 82, No. 12, pp. 1835-1860.*
Jet Propulsion Laboratory, QuikSCAT Science Data Product User's Manual. Jet Propulsion Laboratory Document D-18053-RevA. Pasadena, CA, Sep. 2006.
Hawaii Wind Working Group, Updated wind resource maps, Hawaii's Windiest Loc., hawaii.gov/dbedt/ert/wwg/windy.html, page last modified Sep. 20, 2004.
Alvarez-Perez, J. et al., "Resolution improvement of ERS scatterometer data over land by Wiener Filtering," Remote Sens. Envir., vol. 71, pp. 261-271, Mar. 2000.
Dyson, F. et al., "A determination of the deflection of light by the Sun's gravitational field from observations made at the total eclipse of May 29, 1919," Phil. Trans. of the Royal Society of London, ser. A 220, pp. 291-333, 1920.

(Continued)

*Primary Examiner* — Toan Le
(74) *Attorney, Agent, or Firm* — Gates & Cooper LLP

(57) ABSTRACT

A method, apparatus, system, article of manufacture, and computer readable storage medium provide the ability to measure wind. Data at a first resolution (i.e., low resolution data) is collected by a satellite scatterometer. Thin slices of the data are determined. A collocation of the data slices are determined at each grid cell center to obtain ensembles of collocated data slices. Each ensemble of collocated data slices is decomposed into a mean part and a fluctuating part. The data is reconstructed at a second resolution from the mean part and a residue of the fluctuating part. A wind measurement is determined from the data at the second resolution using a wind model function. A description of the wind measurement is output.

15 Claims, 6 Drawing Sheets

OTHER PUBLICATIONS

Deans, S. The Radon Transform and Some of its Applications. Krieger Publishing Company, Malabar, Florida, 1993, pp. 56-59.

Early, D. et al., "Image reconstruction and enhanced resolution imaging from irregular samples," IEEE Trans. Geosci. Remote Sens., vol. 39, No. 2, pp. 291-302, Feb. 2001.

Ebuchi, N. et al., "Evaluation of wind vectors observed by QuikSCAT/SeaWinds using ocean buoy data," J. Atmos. Ocean. Tech., vol. 19, pp. 2049-2062, Dec. 2002.

Elliott, D. et al., Wind Energy Resource Atlas of the United States, rep. DOE/CH 10093-4, National Renewable Energy Laboratory, Colorado, U.S.A., Oct. 1986.

Kara, A. et al., "A correction for land contamination of atmospheric variables near land-sea boundaries," J. Phys. Oceanog., vol. 37, pp. 803-818, Apr. 2007.

Liu, W. et al., "NASA scatterometer provides global ocean-surface wind fields with more structures than numerical weather prediction," Geophys. Res. Lett., vol. 25, No. 6, pp. 761-764, Mar. 1998.

Long, D. et al., "Resolution enchancement of spaceborne scatterometer data," IEEE Trans. Geosci. Remote Sens., vol. 31 (3), pp. 700-715, 1993.

Nghiem, S. et al., "The dependence of ocean backscatter at $K_u$-band on oceanic and atmospheric parameters," IEEE Trans. Geosci. Remot Sens., vol. 35, No. 3, pp. 581-600, May 1997.

Nghiem, S. et al., "Observations of urban and suburban environments with global satellite scatterometer data," ISPRS J. Photogram. Remote Sens., vol. 64, Mar. 2009, pp. 367-380, doi:10.1016/j.isprsjprs.2009.01.004.

Nghiem, S. et al., "Remote sensing of the global environment with satellite scatterometry," keynote paper in Microwave Remote Sensing of the Atmosphere and Environment VI, Proc. of SPIE, 7154, 715402, Dec. 2008, doi:10.1117/12.804462.

Nghiem, S. et al., "Wind fields over the Great Lakes measured by the SeaWinds scatterometer on the QuikSCAT satellite," J. Great Lakes Res., vol. 30(1), pp. 148-165, 2004.

Owen, M. et al., "Land-contamination compensation for QuikSCAT near-coastal wind retrieval," IEEE Trans. Geosci. Remote Sens., vol. 47 (3), 839-850, 2009.

Rufenach, C., "Comparison of four ERS-1 scatterometer wind retrieval algorithms with buoy measurements," J. Atmos. Ocean. Tech., vol. 15, pp. 304-313, Feb. 1998.

Tsai, W. et al., "Polarimetric scatterometry: A promising technique for improving ocean surface wind measurements from space," IEEE Trans. Geosci., Remote Sens., vol. 38, No. 4, pp. 1903-1921, Jul. 2000.

Wang, Q. et al., "A numerical procedure for recovering scattering coefficients from measurements with wide-beam antennas," IEEE Trans. Geosci. Remote Sens., vol. 29, No. 5, pp. 778-783, Sep. 1991.

Risien, Craig M. et al., "A Satellite-derived climatology of global ocean winds", Remote Sensing of Environment, 2006, 105, pp. 221-236.

Ebuchi, Naoto et al., "Evaluation of Wind Observed by QuikScat/SeaWinds Using Ocean Buoy Data", Journal of Atomospheric and Oceanic Technology, Dec. 2002, vol. 19, pp. 2049-2062.

International Search Report and Written Opinion for International Application No. PCT/US2010/033002 filed on Apr. 29, 2010.

* cited by examiner

HIGH RESOLUTION WIND MEASUREMENTS FOR OFFSHORE WIND ENERGY DEVELOPMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/173,916, filed on Apr. 29, 2009, by Son Van Nghiem, and Gregory Neumann, entitled "HIGH-RESOLUTION WIND MEASUREMENTS FOR OFFSHORE WIND ENERGY DEVELOPMENT,".

STATEMENT REGARDING FEDERALLY SPONSORED RESEARCH AND DEVELOPMENT

The invention described herein was made in the performance of work under NASA contract number NAS7-1407, and is subject to the provisions of Public Law 96-517 (35 USC 202) in which the Contractor has elected to retain title.

BACKGROUND OF THE INVENTION

1. Field of the Invention

The present invention relates generally to offshore wind energy development, and in particular, to a method, apparatus, and article of manufacture for determining a fundamental dataset of offshore wind climatology at 1-km posting, based on the decadal satellite scatterometer data record from the entire lifetime of the QuikSCAT mission.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Energy is a critical issue facing all from local to regional, national, and international levels. With recent development of wind tower technologies, offshore wind energy emerges as an important component of the global total renewable energy portfolio. Recognizing both the value and the complexity of offshore wind energy development, energy communities, commissions, and consortiums have been formed in many regions, which identify long-term high-resolution wind measurements as critical data to evaluate and select locations appropriate for wind farming. Thus, high-resolution wind measurements have a crucial role in addressing renewable energy and climate change. In this regard, to determine where to best locate an offshore wind farm, an accurate determination/measurement of the location of offshore winds is necessary.

The National Renewable Energy Laboratory (NREL) classifies wind power density into seven classes [1] in which Class 4 or above is appropriate for wind farm development. For the estimation of the NREL power density classes, accurate long-term historical wind data are required. While model analyses are available in a number of selected regions, there are discrepancies among models and significant land contamination effects near land-sea boundaries [2]. Moreover, it is recommended that model estimates at any location be confirmed by measurements.

One method used to confirm such measurements utilizes buoys at designated locations to obtained point measurements that may not represent wind conditions in the surrounding area. In this regard, buoy measurements are obtained at a very limited number of locations and provide point data that do not represent the wind distribution over the region. For example, the buoy size itself is likely only 10-20 feet and only measures wind directly in the vicinity of the buoy. Accordingly, buoy calculations are not accurate or truly representative of wind as the distance from the buoy increases. While additional buoys may be utilized, they cannot be placed every kilometer over the entire ocean surface and still only provide limited point data. If a buoy is deployed in every 1 $km^2$ across the world ocean, over 360 million buoys are needed. Assuming an impossibly low cost of $1,000 for each buoy per year, the total cost would amount to $3.6 trillion for a decade of data. Therefore, the extreme costs of manufacturing, deploying, maintaining, and replenishing such a global massive buoy system over a decade are prohibitive let alone any other associated issues.

Wind speed can be measured by satellite synthetic aperture radars; however, data are limited in accuracy, in time, and in space. Routine measurements of surface wind fields over global waters have been demonstrated by satellite scatterometer missions, where stable and accurate radars provide coarse resolutions [3-6]. In such missions, a wind scatterometer determines the normalized radar cross section (sigma) of the surface by transmitting a pulse of microwave energy towards the Earth's surface and measuring the energy scattered backward (backscatter) to the scatterometer. By combining the sigma measurements from different azimuth angles, the near-surface wind vector over the ocean's surface can be determined using a geophysical model function that relates wind and backscatter. However, due to the original coarse resolution (e.g., 25 km) and land contamination effects, standard wind products from the scatterometer missions are not valid by 2 pixels or 50 km away from shore.

While it is desirable for a wind farm to locate at some distance (~10 km) away from shore for higher and steadier wind speeds and because of issues related to ocean view, noise, navigation, security, and environmental impacts, wind tower technologies and bathymetry may limit the distance to within a few tens of km from shore (~50-100 km). Thus, the standard coarse low-resolution satellite wind products from satellite scatterometer data are neither useful nor applicable.

To utilize satellite scatterometer data for offshore wind energy applications, the spatial resolution must be increased significantly. In this regard, attempts have been made to reconstruct high-resolution data based on low-resolution data. Algorithms for high-resolution data reconstruction from low-resolution data are traditionally based on the deconvolution method, such as the Computer Tomography scan (CT scan) used in medical imaging, for which Hounsfield and Cormack earned the 1979 Nobel Prize in medicine. In this regard, the traditional deconvolution approach has been used to enhance resolution of radar data [7-9]. However, such approaches require that radar backscatter remains unchanged in each high-resolution pixel during the period of data acquisition used in the resolution enhancement process (similar to requiring a patient to stay still while the CT scan is made), and are not applicable to backscatter data acquired over ocean surface that are rapidly variable in time and in different azimuth angles. In this regard, characteristics of water surface with wind-generated waves and roughness can change in a short time depending on wind variability. Moreover, the directional feature of waves causes differences in backscatter at different azimuth angles in data collected even within the same orbit. These backscatter variations invalidate the fundamental requirement of backscatter invariant for the deconvolution approach to be applicable. Therefore, a new method is necessary to account for backscatter change in the process to construct high-resolution data.

In view of the above, what is needed is the capability to obtain high-resolution wind climatology for offshore wind energy applications (that account for backscatter change) and for use in other scientific research.

SUMMARY OF THE INVENTION

A new method to measure offshore/near-shore wind utilizes a unique dataset of offshore wind climatology at 1-km posting from a decade of National Aeronautics and Space Administration (NASA) QuikSCAT satellite scatterometer data. High-resolution scatterometer results, as close as 10-15 km to shore, are compared with model patterns of the National Renewable Laboratory (NREL) wind density classes to show potential areas for wind energy development in near-shore waters. High-resolution wind atlases can be made for various science studies and practical applications.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention overcome the problems of the prior art by utilizes a transform operation that is applied on the mean and fluctuating parts of targeted pixels to construct data in a high-resolution grid at 1-km postings for wind measurements over water surfaces such as oceans or lakes.

Hardware and Software Environment

Figure 1:
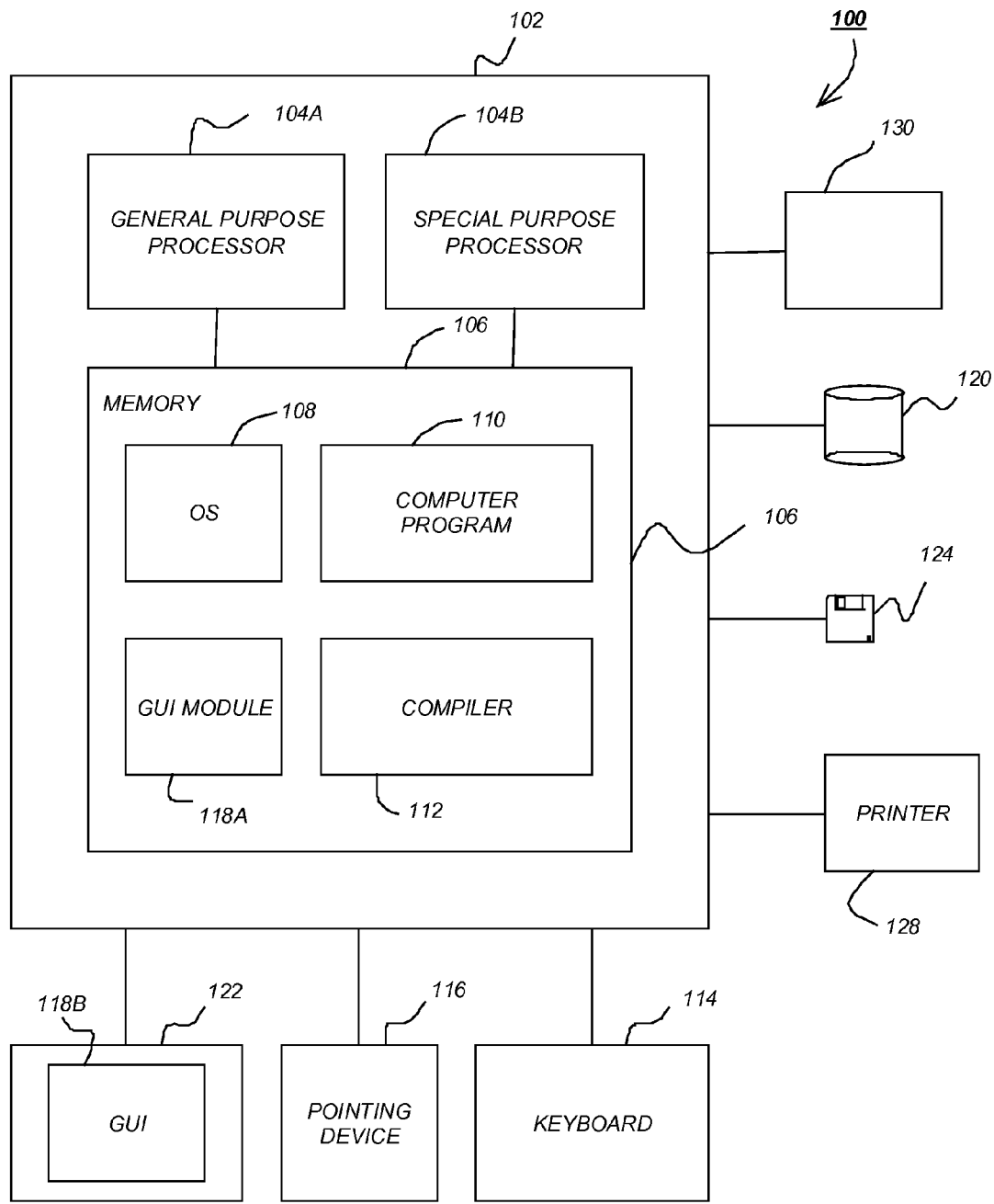
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a cursor control device 116 (e.g., a mouse, a pointing device, pen and tablet, etc.) and a printer 128. Additionally, satellite transmission data may be input into computer 102 directly or indirectly. In other words, radar based data (see detailed description below) may be received into computer 102 or received via another device and used by computer 102.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Each liquid crystal of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Although the term "user computer" or "client computer" is referred to herein, it is understood that a user computer 102 may include portable devices such as cell phones, notebook computers, pocket computers, or any other device with suitable processing, communication, and input/output capability.

Software Embodiments

Embodiments of the invention may be performed using the computer hardware and software environment described above. More specifically, the computer program 110 may implement and provide the ability to construct data in a high-resolution grid based on a transform applied to various data while accounting for backscatter change. Initially, one begins with low resolution data available from a satellite scatterometer. Thereafter, a dense sampling method (DSM) is used to construct the data in a high-resolution grid.

Satellite Scatterometer Data

Figure 2:
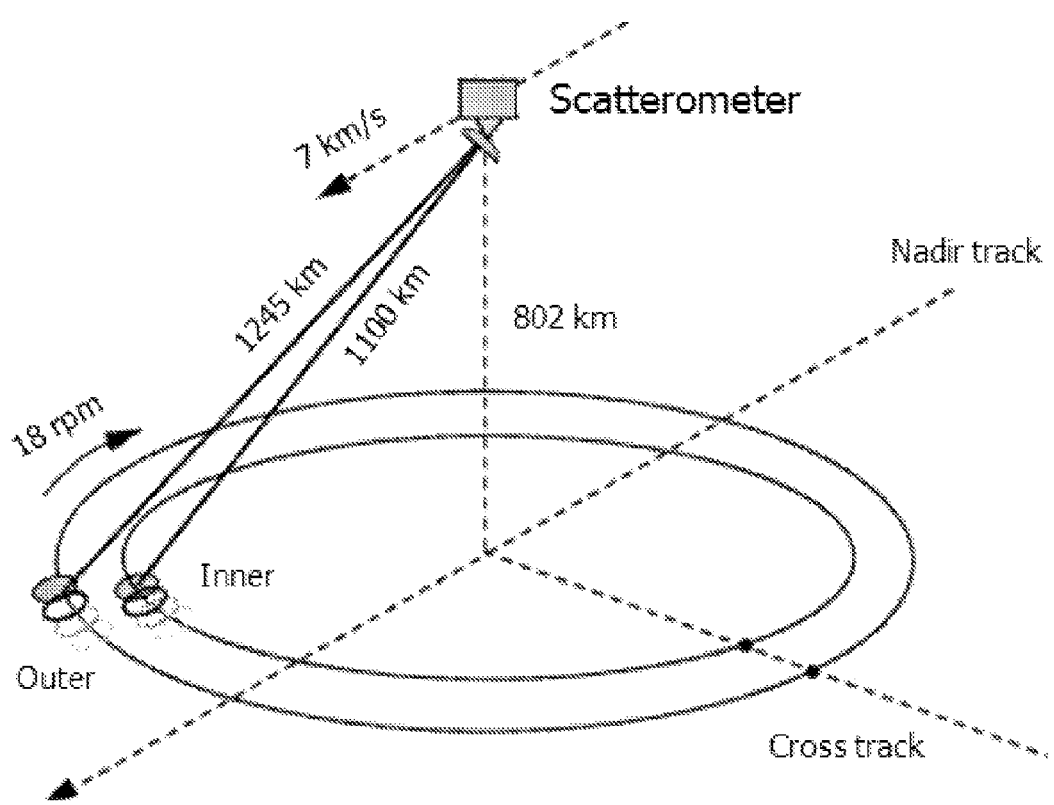
FIG. 2 illustrates a conical scanning configuration of the SeaWinds scatterometer aboard the QuikSCAT satellite.

Among several global scatterometer datasets, the SeaWinds scatterometer mission with the QuikSCAT (QS) satellite has been providing the most stable and accurate backscatter data across the world on a daily basis for more than a decade. QS was launched from Vandenberg Air Force Base in California in June 1999, and continued to operate in a low-earth orbit along sun-synchronous passes until November 2009. QS acquired data with a scanning pencil-beam antenna across large swaths over the Earth's surface [10]. QS collected global data covering 90% of the Earth's surface each day [11]. The QS footprint (two-way, half-power, full beam width) has an elongated or 'egg' shape (FIG. 2) of about 25 km in azimuth by 37 km in range. In this regard, FIG. 2 illustrates a conical scanning configuration of the SeaWinds scatterometer. The outer scan has a swath width of 1800 km for the vertical polarization and the inner swath is 1400 km for the horizontal polarization, which are centered along the nadir track. Moreover, the transmitted radar pulse is modulated (chirped), and the received pulse is Doppler compensated before it is processed through a fast-Fourier-transform stage to achieve a sub-footprint resolution. This linear frequency modulation chirp function is capable of generating sub-footprints or thin "slices" of 25 km in azimuth with a commendable range resolution of 2-10 km with a nominal value at 6 km [11]. This QS dataset is used as the low-resolution data in embodiments of the invention and is input into computer system 102.

Dense Sampling Method

The new method, called the Dense Sampling Method (DSM), is based on the Rosette Transform applied on the mean and fluctuating parts of each targeted pixel to construct the data in a high-resolution grid at 1-km posting. DSM has been successfully applied to observed urban and suburban environments [12]. Unlike the deconvolution method, DSM allows the use of the low-resolution data collected by the satellite scatterometer from space to construct high resolution data over targets with varying signatures such as on water surfaces roughened by winds.

Consider an x-y coordinate surface where the center of a radar footprint is located at $(x_k, y_k)$. In the formulation below, $(x_k, y_k)$ is set at $(0,0)$ for simplicity without loss of generality, and all backscatter quantities are in the linear domain (as opposed to the decibel or dB domain that is logarithmic and non linear). The radar gain pattern is approximately modeled with an elongated Gaussian beam tilted at an azimuth angle of $\phi_i$ as defined by the following expression $$G(\phi_i, x, y) = \exp\left[-\left(\frac{x\cos\phi_i + y\sin\phi_i}{a}\right)^2 - \left(\frac{-x\sin\phi_i + y\cos\phi_i}{b}\right)^2\right] \quad (1)$$

where parameters a and b are determined by the full beam-width $W_x$ in azimuth and $W_y$ in range, respectively with the equations below $$a = \frac{W_x}{2\sqrt{\ln 2}} \quad b = \frac{W_y}{2\sqrt{\ln 2}} \quad (2)$$

At the azimuth angle of $\phi_i = 0$, the Gaussian beam has the simple form of $$G(\phi_i, x, y) = \exp(-x^2/a^2 - y^2/b^2) \quad (3)$$

Backscatter $\sigma_0(\phi_i, t_i, x, y)$ at location (x,y), measured at time $t_i$ in an azimuth direction of $\phi_i$, is derived from the antenna power beam $G(\phi_i, x, y)$, transmitted power $P_{Ti}$, received power $P_{Ri}$, wavelength $\lambda$, and distance R between the satellite and the targeted area A far away from the scatterometer by the radar equation $$P_{Ri} = \frac{P_{Ti}\lambda^2}{(4\pi)^3 R^4} \int\int_A dx\, dy\, G(\phi_i, x, y)\sigma_0(\phi_i, t_i, x, y) \quad (4)$$

Because the footprint covers many locations with different backscatter values in a targeted area, a single radar measurement at azimuth angle $\phi_i$ can be characterized with an average backscatter value $\bar{\sigma}_0(\phi_i, t_i)$ to allow it to be factored out of the integration so that $$P_{Ri} = \frac{P_{Ti}\lambda^2}{(4\pi)^3 R^4} \overline{\sigma}_0(\phi_i, t_i) \int\int_A dx\,dy\,G(\phi_j, x, y) \quad (5)$$

In this formulation, $\overline{\sigma}_0(\phi_i, t_i)$ represents the measured backscatter and other backscatter values are calculated. Substituting (5) into (4), the averaged backscatter can be expressed as:

$$\overline{\sigma}_0(\phi_i, t_i) = \frac{1}{\Gamma_A} \int\int_A dx\,dy\,G(\phi_j, x, y)\sigma_0(\phi_j, t_i, x, y) \quad (6)$$

where the integrated gain-area product has been defined as $$\Gamma_A = \int\int_A dx\,dy\,G(\phi_j, x, y) \quad (7)$$

The formulation given by (6) is similar to the two-dimensional Radon transform used in tomography imaging when $G(\phi_i, x, y)$ is replaced with the Dirac delta function [13]. However, as described above, such a radon transform is used when the backscatter remains unchanged and cannot be used for targets with varying signatures such as on water surfaces roughened by winds.

An ensemble average of N samples of backscatter data may be measured at azimuth angle $\phi_i$ at time $t_i$ densely populated within area A. From many measurements with their footprint centers collocated at $(x_k, y_k) = (0,0)$, the backscatter ensemble $\overline{\sigma}_0$ is represented by the following equation $$\overline{\sigma}_0 = \frac{1}{N}\sum_{i=1}^{N} \overline{\sigma}_0(\phi_i, t_i) = \frac{1}{N\Gamma_A}\sum_{i=1}^{N} \int\int_A dx\,dy\,G(\phi_j, x, y)\sigma_0(\phi_j, t_i, x, y) \quad (8)$$

Similar backscatter ensembles are carried out at all other locations $(x_k, y_k)$, densely posted in each 30 arcsec in latitude and in longitude (about 1 km near the equator). As such, DSM includes data densely sampled in terms of both azimuth diversity and posting locations. Note that data with their centers outside of each posting are not included at all in the ensemble at that posting. This is equivalent to imposing a binary weighting function $W(x_k, y_k)$ with a value of 1 inside and 0 outside the 30-arcsec posting area centered at $(x_k, y_k)$.

The target may be decomposed into two different parts: (1) the average represented as $\overline{\sigma}_0(x, y)$; and (2) the changing or fluctuation represented by $\epsilon(\phi_i, t_i, x, y)$. In this regard, at each coordinate (x,y), backscatter $\sigma_0(\phi_i, t_i, x, y)$ at the posting $(x_k, y_k) = (0,0)$ is composed of a mean part of $\overline{\sigma}_0(x, y)$, averaged over all $\phi_i$ and all $t_i$, and a zero-mean fluctuation part of $\epsilon(\phi_i, t_i, x, y)$ variable in $\phi_i$ at different time $t_i$, so that $$\sigma_0(\phi_i, t_i, x, y) = \overline{\sigma}_0(x, y) + \epsilon(\phi_i, t_i, x, y) \quad (9)$$

Using (9) in (8) and separating the mean and fluctuation parts, one can obtain:

$$\overline{\sigma}_0 = \frac{1}{N\Gamma_A}\sum_{i=1}^{N} \int\int_A dx\,dy\,G(\phi_j, x, y)\overline{\sigma}_0(x, y) + \quad (10)$$

$$\frac{1}{N\Gamma_A}\sum_{i=1}^{N} \int\int_A dx\,dy\,G(\phi_j, x, y)\epsilon(\phi_j, t_i, x, y)$$

Each of the two terms in (10) can be examined to describe its meaning. For the first term, denoted as $\overline{\sigma}_{0M}$, the order of the summation and the double integration are interchanged, and the mean part $\overline{\sigma}_0(x, y)$ is factored out of the summation since it is independent of angle $\phi_i$ at time $t_i$ so that $\overline{\sigma}_{0M}$ becomes:

$$\overline{\sigma}_{0M} = \frac{1}{\Gamma_A} \int\int_A dx\,dy \left[\sum_{i=1}^{N} \frac{G(\phi_i, x, y)}{N}\right]\overline{\sigma}_0(x, y) \quad (11)$$

$$= \frac{1}{\Gamma_A} \int\int_A dx\,dy\,G(x, y)\overline{\sigma}_0(x, y)$$

In (11), the equivalent composite power gain is defined as:

$$G(x, y) = \sum_{i=1}^{N} \frac{G(\phi_i, x, y)}{N} \quad (12)$$

As expressed in (12), the composite gain is a linear combination of the elongated patterns of the thin slices at different azimuth angles. Accordingly, from the decomposed target, the measurements can be reconstructed at a higher resolution. For a figurative description of (12), consider a simple case where G(x,y) consists of two perpendicular slices with their center collocated at $(x_k, y_k) = (0,0)$. In this case, the elongated patterns of the two thin slices form a composite pattern similar to a four-petal rosette. The four-petal pattern has a high gain around the center and the gain gradually tapers into the four-petal sides. When G(x,y) includes multiple thin slices over different azimuth angles, the composite pattern becomes similar to a multi-petal rosette. As such, the transformation defined by (11) and (12) is called the Rosette Transform. For a large number of collocated thin slices collected in the full range of azimuth angles, the composite gain G(x,y) in the Rosette Transform approaches an isotropic pattern with the gain uniformly distributed around the peak at the center.

Since all backscatter samples are overlapped near the center of each posting and are separated at the far ends of the individual elongated power pattern, the composite gain is preserved at the center while it is more weighted down farther away from the center. In this method, the multi-azimuth composition of the thin slices forms the equivalent gain G(x,y) that achieves a higher resolution approximately at the scale of the smallest dimension of the thin slice footprint for the mean backscatter at each posting (every 30 arcsec in latitude and in longitude).

The second term in (12), represented by $\mathcal{R}$, can be rearranged in the form of $$\mathcal{R} = \frac{1}{\Gamma_A} \int\int_A dx\,dy \sum_{i=1}^{N} \left[\frac{G(\phi_i, x, y)}{N}\epsilon(\phi_i, t_i, x, y)\right] \quad (13)$$

where the fluctuation term $\epsilon(\phi_i, t_i, x, y)$ cannot be factored out of the summation because both the fluctuation term and the individual gain are azimuthally dependent.

It is noted that, while $\epsilon(\phi_i, t_i, x, y)$ has a zero mean as defined by (9), the ensemble average in (13) of $\epsilon(\phi_i, t_i, x, y)$, which is individually weighted by a different gain factor $G(\phi_i, x, y)$ at each azimuth angle $\phi_i$, is not necessarily zero in general.

For a small number of samples, the mean part is not representative and the residual makes the composite result of backscatter noisy. By a sacrifice of the temporal resolution of scatterometer data over a long period of time, such as over a year or over multiple years or over the QS lifetime, one can obtain a stable mean of backscatter at each posting, and the residual becomes small as it can be positive at one azimuth angle and negative at another azimuth angle. Moreover, (13) indicates that a fluctuation outlier is suppressed directly by the sample number N. This is because N appears in the denominator inside the summation in (13) for each fluctuation term $\epsilon(\phi_i, t_i, x, y)$ corresponding to index i. Thereby, an outlier fluctuation term due to an infrequent abnormal case is divided by N when it is averaged together with many other samples at different azimuth angles. Since a long time period is needed to obtain sufficient data for a stable mean with a small residual, a necessary condition of DSM is that the targeted area maintains persistent characteristics or climatological patterns during each long period of the ensemble averaging process.

Note that (10) allows variability in azimuth and in time within each targeted area, such as the azimuth asymmetry of wind-driven waves on ocean surface. Natural occurrences, including wind, snow, rains, floods, droughts, or diurnal temperature changes, affect the geometric and electromagnetic properties of the environments causing changes in radar backscatter. These changes are included in the residual term given by (13). The variability of each backscatter ensemble can be characterized by its variance or its standard deviation to represent how much change occurred in each posting. The standard deviation is related to variations (such as wind speed distribution) and can be used to characterize the variability. Furthermore, the general DSM formulation allows the use of data at both vertical (VV) and horizontal (HH) polarizations, and their different signature is included in the standard deviation.

The new concept of DSM presented above is different from the deconvolution approach traditionally used to enhance resolution of radar data ([7], [8], [18], and [19]). DSM is simply based on a linear composition of a set of thin-slice beam measurements as indicated by [12] to obtain a sharper and higher-resolution result by the multi-azimuth composition instead of deconvolving overlapping beams. DSM suppresses fluctuations in backscatter of a stationary target due to azimuth asymmetry and environmental changes, while such changes together with noise cause spurious artifacts amplified by the non-linear deconvolution process.

In the deconvolution approach, [8] assume azimuthally independent radar echo, which is applicable to an isotropic area such as a forested area with vegetation randomly oriented in azimuth, and such assumption is not valid for an azimuthally asymmetric area (such as ocean surface). Especially for wind over an ocean or a lake, backscatter can be significantly different even within one single orbit (fore and aft looks) dues to the azimuth asymmetry. The deconvolution approach further requires that backscatter of the targeted area remains unchanged during the time period of data acquisition for the resolution enhancement ([9]). Such requirements and the azimuth asymmetry invalidate the resolution enhancement result by the deconvolution method when a transient effect (e.g., wind, snowmelt, precipitation, flood, diurnal effects, etc.) causes a backscatter change in the targeted area.

Results and Verification

A prototype of the above method has been developed to obtain initial high-resolution backscatter to validate the applicability of the method to QS data and to verify the accuracy of the new results for high-resolution backscatter. There are three aspects to confirm: (1) can the geographic target be correctly located?; (2) can the shape of the target be reconstructed accurately?; and (3) can the surface area be calculated accurately?

For the verification purpose, a target can be selected with backscatter higher than its surrounding environment, such as a small island isolated in an ocean where geophysical conditions are stable and no significant change of the coastline has occurred since the launch of QS in 1999. A candidate for this test is the Principe Island, located around 1.62° N and 7.40° E off the central west coast of Africa. This island is famous as the site where Eddington experimentally proved Einstein's theory of relativity using a solar eclipse in 1919 [14].

Figure 3:
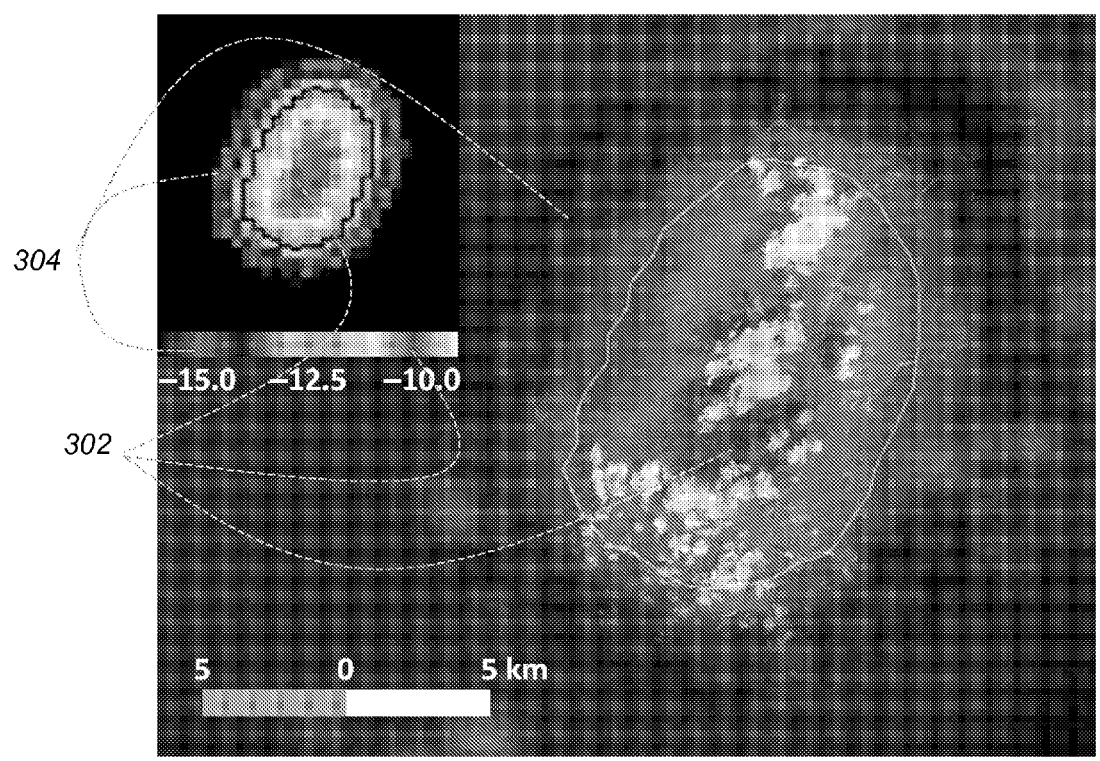
FIG. 3 presents the original Dense Sampling Method (DSM) backscatter image (inset) and a semi-transparent overlay of the DSM image on a GOOGLE EARTH™ map of the island of Principe where clouds appeared as white areas in accordance with one or more embodiments of the invention.

FIG. 3 presents the original DSM backscatter image (inset) and a semi-transparent overlay of the DSM image on a GOOGLE EARTH™ map of the island of Principe where clouds appeared as white areas. The DSM backscatter threshold of −12.5 dB (black contour in the inset, and white contour in the map overlay) is consistent with the island extent.

The island has backscatter higher than that of the surrounding ocean as seen in the scale from −10 dB (red 302) on the island down to −15 dB at the dark edge 304 in the ocean around the island. Note that the coast line contour at −12.5 dB is simply the average between −10 dB of the island and −15 dB of the ocean. The 30-arcsec posting gives a smooth transition between two adjacent areas with low and high backscatter values, enabling a consistent identification of the boundary between the two areas. The result in FIG. 3 indicates that the backscatter threshold of −12.5 dB corresponds with the extent of the island within a couple of km. Within this threshold, the area calculated from the DSM image is 130 km$^2$, which is very close to a true area of 136 km$^2$ of the Principe Island. The general shape of the DSM image is also consistent with the shape of the island, which is elongated in the north-south direction. Furthermore, the geolocation of the DSM image coincides well with the map of the island. This case of a real target verifies the capability of DSM in delineating the high-resolution extent of a target and the accuracy of the DSM geolocation derived from QS LIB data. In another case [15], it can be shown that DSM is able to identify and accurately locate the Nukunonu Atoll in the South Pacific Ocean, a circular strip of land with a width of about 200 m located approximately 1280 km to the east-northeast of Fiji.

Procedure for Wind Energy Estimate

The procedure for offshore wind energy applications includes: (a) high-resolution backscatter data processing, (b) calculations of wind fields from QS backscatter empirical formulation, (c) verification of wind results with available surface measurements from buoys and ships, and (d) wind power estimates using the satellite high-resolution wind climatology dataset. The implementation of the high-resolution algorithm needs to include data processing for long-term data (~10 years) and for data partition in time to determine diurnal, seasonal, and interannual variabilities. For item (b), empirical geophysical model functions [5, 11, and 16] can be used to calculate high-resolution wind speed from high-resolution backscatter obtained in step (a).

Figure 4A:
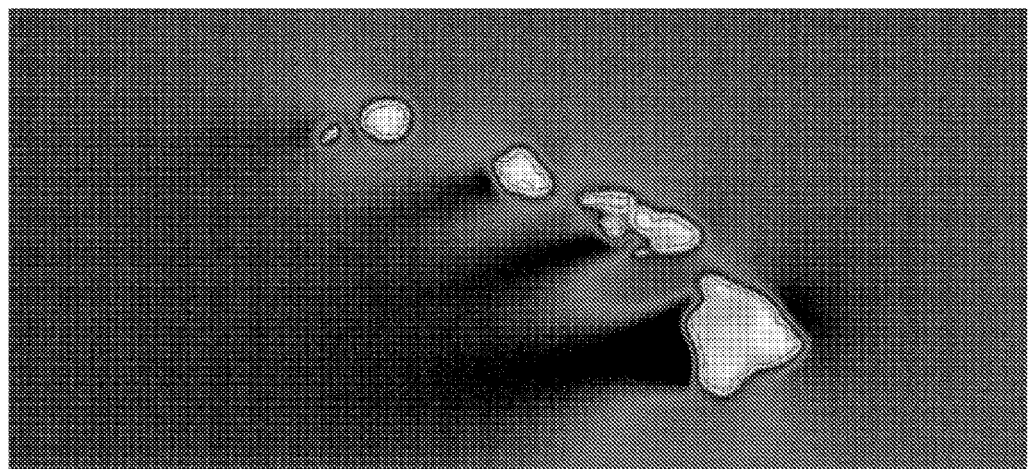
FIG. 4(a) illustrates a QuikSCAT backscatter signature pattern at 1-km posting in accordance with embodiments of the invention.
Figure 4B:
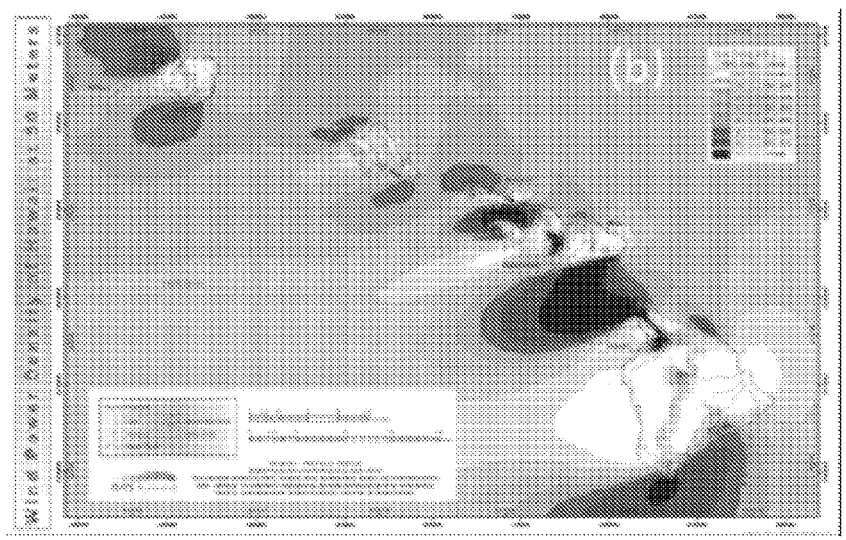
FIG. 4(b) illustrates NREL power density estimated by the Hawaii Wind Working Group in accordance with one or more embodiments of the invention.
Figure 5:
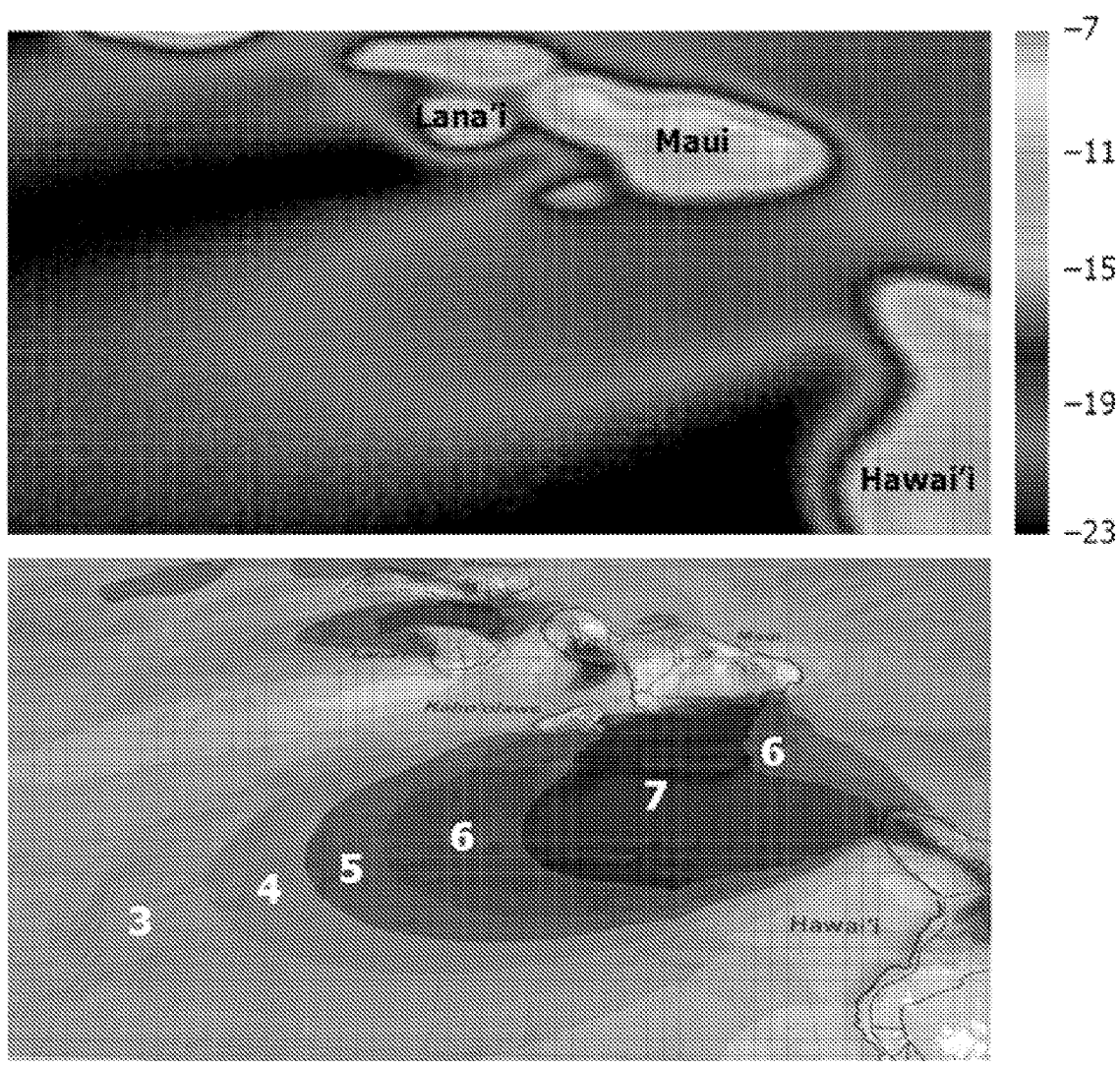
FIG. 5 illustrates an example for the case of Hawaii to compare the high-resolution backscatter pattern with wind power density classes from model calculations in accordance with one or more embodiments of the invention.

FIG. 4(a) illustrates a QS backscatter signature pattern at 1-km posting in accordance with embodiments of the invention, and FIG. 4(b) illustrates NREL power density estimated by the Hawaii Wind Working Group [17]. Similarly, FIG. 5 illustrates an example for the case of Hawaii to compare the high-resolution backscatter pattern with wind power density from model calculations [17] in accordance with one or more embodiments of the invention. FIG. 4(a) and the upper panel of FIG. 5 are for a QS backscatter (left scale in dB) signature pattern at 1-km posting derived from DSM. FIG. 4(b) and the lower panel of FIG. 5 are for power density estimated by the Hawaii Wind Working Group [17] with the NREL classes marked in FIG. 5 by the white numbers. Ocean bathymetry is represented by the shaded relief in FIG. 4(b) and the lower panel of FIG. 5.

The patterns of DSM backscatter and of model-calculated NREL power density classes compare consistently overall. DSM backscatter has land effects within 10-15 km from shore, where DSM results should not be used and such water area adjacent to the coastline will not be useful for wind energy development anyway as pointed out earlier. The comparison reveals discrepancies such as anomalous lobes of high wind energy in the model estimates that are not consistent with the DSM pattern from QS satellite data. The results illustrate the deficiency in model results, containing biases and artifacts so that the Hawaii Wind Working Group itself recommends that actual measurements should be used to obtain an accurate estimate of wind energy.

Examining FIG. 5, one may note that in the upper panel, between Hawaii and Maui, the DSM pattern protrudes approximately toward the southwest direction without a back lobe of high wind. However, the corresponding area in the lower panel indicates a different wind energy density pattern with a back lobe of high energy (grey area of class 4 to the right of class 6 between Hawaii and Maui) that is inaccurate. Instead, the patterns determined using the methods of the invention illustrated in the upper panel more accurately reflect the true wind patterns around the Hawaiian Islands. Further, examining FIG. 4(b) from the model estimate, one may note the dark shaded lobe around the southern tip of Hawaii indicating high wind energy which is not depicted in FIG. 4(a) from the DSM satellite measurement.

In addition to the accuracy described above, it may further be noted that if one were to utilize prior art techniques, Maui itself is merely a couple footprints and such result are therefore neither useful nor applicable.

Logical Flow

Figure 6:
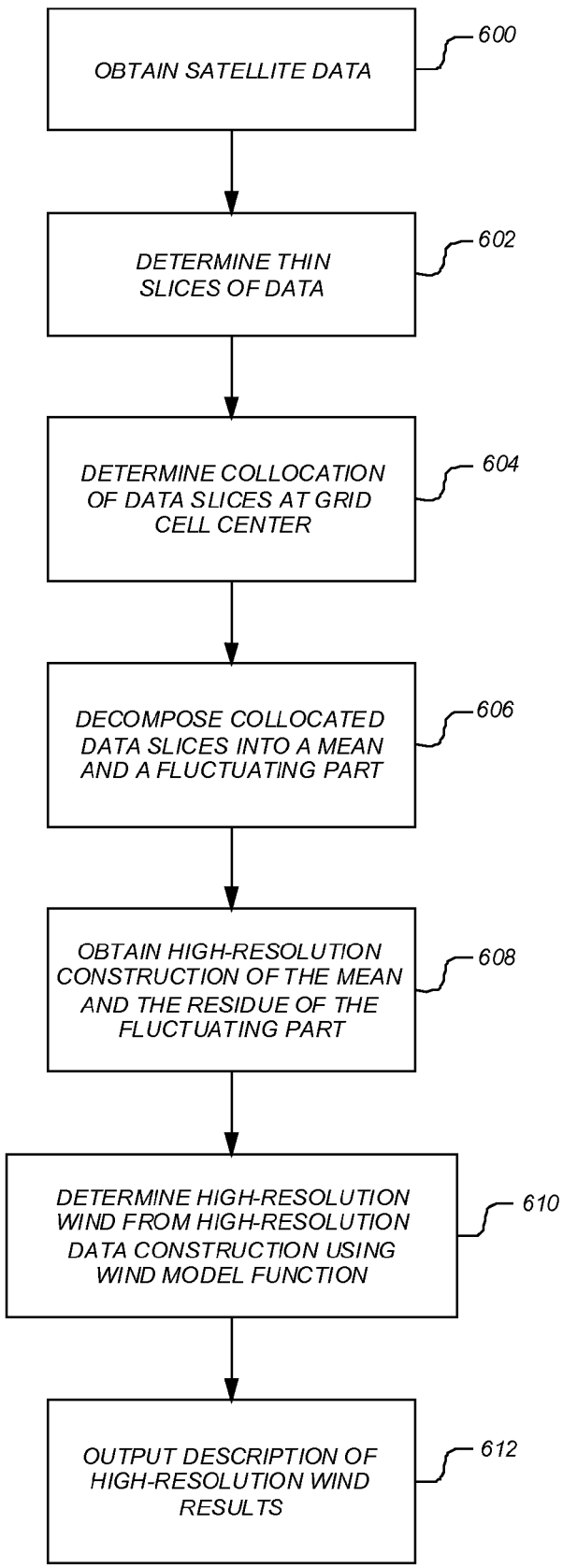
FIG. 6 is a flow chart illustrating the logical flow for measuring wind in accordance with one or more embodiments of the invention.

FIG. 6 is a flow chart illustrating the logical flow for measuring wind in accordance with one or more embodiments of the invention.

At step 600, data at a first resolution (i.e., low resolution data) that has been collected by a satellite scatterometer in space is obtained. In this regard, the data may be obtained from the QuikSCAT scatterometer mission over a ten-year period of time (or other active or passive radiation data). The low resolution data may be represented by a radar equation:

$$P_{Ri} = \frac{P_{Ti}\lambda^2}{(4\pi)^3 R^4} \int\int_A dx\, dy\, G(\phi_i, x, y) \sigma_0(\phi_i, t_i, x, y)$$

wherein, $\sigma_0(\phi_i, t_i, x, y)$ comprises backscatter at location (x,y) measured at time $t_i$ in an azimuth direction of $\phi_i$, $G(\phi_i, x, y)$ comprises an antenna power beam, $P_{Ti}$ comprises transmitted power, $P_{Ri}$ comprises received power, $\lambda$ comprises wavelength, and R comprises a distance between the satellite and a targeted area A.

At step 602, one or more thin slices of the data are determined.

At step 604, a collocation of the data slices at a grid cell center are determined. Step 604 results in one or more ensembles of collocated data slices.

At step 606, the collocated data slices are decomposed into a mean/average part and a fluctuating part. The decomposing of the collocated data slices is represented by:

$$\sigma_0(\phi_i, t_i, x, y) = \overline{\sigma}_0(x, y) + \epsilon(\phi_i, t_i, x, y),$$

wherein at each coordinate (x,y), backscatter $\sigma_0(\phi_i, t_i, x, y)$ at a posting $(x_k, y_k) = (0,0)$ is composed of the mean part $\overline{\sigma}_0(x, y)$, averaged over all $\phi_i$ and all $t_i$, and a zero-mean fluctuation part of $\epsilon(\phi_i, t_i, x, y)$ variable in at different time $t_i$.

At step 608, the data is reconstructed into a second resolution (i.e., high resolution data) including the mean part and a residue of the fluctuating part. The reconstructing of the high-resolution result of the mean part, using a rosette transform, is defined by:

$$\overline{\sigma}_{0M} = \frac{1}{\Gamma_A} \int\int_A dx\, dy \left[ \sum_{i=1}^{N} \frac{G(\phi_i, x, y)}{N} \right] \overline{\sigma}_0(x, y)$$

$$= \frac{1}{\Gamma_A} \int\int_A dx\, dy\, G(x, y) \overline{\sigma}_0(x, y)$$

wherein $\overline{\sigma}_{0M}$ represents the mean value at the high resolution, $\Gamma_A$ defines an integrated gain-area product, $G(\phi_i, x, y)$ defines an antenna beam at an azimuth angle $\phi_i$ at point (x,y), and an equivalent composite power gain is defined as:

$$G(x, y) = \sum_{i=1}^{N} \frac{G(\phi_i, x, y)}{N}.$$

At step 610, a wind measurement (i.e., high resolution wind results) is determined from the high-resolution data construction using a wind model function.

At step 610, a description of the high-resolution wind results are output (e.g., to a graphical user interface, file, or other mechanism configured to use/display the results).

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

References

[1] D. L. Elliott, C. G. Holladay, W. R. Barrchet, H. P. Foote, and W. F. Sandusky, Wind Energy Resource Atlas of the United States, rep. DOE/CH 10093-4, National Renewable Energy Laboratory, Colorado, U.S.A., October 1986.

[2] A. B. Kara, A. J. Wallcraft, and H. E. Hurlburt, "A correction for land contamination of atmospheric variables near land-sea boundaries," J. Phys. Oceanog., vol. 37, pp. 803-818, April 2007.

[3] T. Liu, W. Q. Tang, and P. S. Polito, "NASA scatterometer provides global ocean-surface wind fields with more structures than numerical weather prediction," Geophys. Res. Lett., vol. 25, pp. 761-764, March 1998.

[4] N. Ebuchi, H. C. Graber, and M. J. Caruso, "Evaluation of wind vectors observed by QuikSCAT/SeaWinds using buoy data," J. Atmos. Ocean. Tech., vol. 19, pp. 2049-2062, December 2002.

[5] S. V. Nghiem, G. A. Leshkevich, and B. W. Stiles, "Wind fields over the Great Lakes measured by the SeaWinds scatterometer on the QuikSCAT satellite," J. Great Lakes Res., vol. 30, pp. 148-165, 2004.

[6] C. Rufenach, "Comparison of four ERS-1 scatterometer wind retrieval algorithms with buoy measurements," J. Atmos. Ocean. Tech., vol. 15, pp. 304-313, February 1998.

[7] Q. Wang and S. Gogineni, "A numerical procedure for recovering scattering coefficients from measurements with wide-beam antennas," IEEE Trans. Geosci. Remote Sens., vol. 29, pp. 778-783, September 1991.

[8] J. L. Alvarez-Pérez, S. J. Marshall, and K. Gregson, K., "Resolution improvement of ERS scatterometer data over land by Wiener filtering," Remote Sens. Envir., vol. 71, pp. 261-271, March 2000.

[9] D. S. Early and D. G. Long, "Image reconstruction and enhanced resolution imaging from irregular samples," IEEE Trans. Geosci. Remote Sens., vol. 39, pp. 291-302, February 2001.

[10] W.-Y. Tsai, S. V. Nghiem, J. N. Huddleston, M. W. Spencer, B. W. Stiles, and R. D. West, D., "Polarimetric scatterometry: A promising technique for improving ocean surface wind measurements from space," IEEE Trans. Geosci. Remote Sens., vol. 38, pp. 1903-1921, July 2000.

[11] Jet Propulsion Laboratory, QuikSCAT Science Data Product User's Manual. Jet Propulsion Laboratory Document D-18053-RevA. Pasadena, Calif., 2006.

[12] S. V. Nghiem, D. Balk, E. Rodriguez, G. Neumann, A. Sorichetta, C. Small, and C. D. Elvidge, "Observations of urban and suburban environments with global satellite scatterometer data," ISPRS J. Photogram. Remote Sens., vol. 64, March 2009, pp. 367-380, doi:10.1016/j.isprsjprs.2009.01.004.

[13] S. R. Deans, The Radon Transform and Some of its Applications. John Wiley & Sons Inc., New York, 1983.

[14] F. W. Dyson, A. S. Eddington, and C. R. Davidson, "A determination of the deflection of light by the Sun's gravitational field from observations made at the total eclipse of May 29, 1919," Phil. Trans. of the Royal Society of London, ser. A 220, pp. 291-330., 1920.

[15] S. V. Nghiem and G. Neumann, "Remote sensing of the global environment with satellite scatterometry," keynote paper in Microwave Remote Sensing of the Atmosphere and Environment VI, ed A. Valinia, P. H. Hildebrand, and S. Uratsuka, Proc. of SPIE, 7154, 715402, December 2008, doi:10.1117/12.804462.

[16] S. V. Nghiem, F. K. Li, and G. Neumann, "The dependence of ocean backscatter at Ku-band on oceanic and atmospheric parameters.," IEEE Trans. Geosci. Remote Sens., vol. 35, pp. 581-600, May 1997.

[17] Hawaii Wind Working Group, Updated wind resource maps, Hawaii's Windiest Loc., hawaii.gov/dbedt/ert/wwg/windy.html, accessed 2009.

[18] D. G. Long, P. J. Hardin, and P. T. Whiting, "Resolution enhancement of spaceborne scatterometer data," IEEE Trans. Geosci. Remote Sens., vol. 31 (3), pp 700-715, 1993.

[19] M. P. Owen, and D. G. Long, Land-contamination compensation for QuikSCAT near-coastal wind retrieval. IEEE Trans. Geosci. Remote Sens., vol. 47 (3), 839-850, 2009.

What is claimed is:

1. A computer implemented method for measuring high-resolution wind, comprising:
    obtaining, in a computer, data at a first resolution collected by a satellite scatterometer, wherein the data comprises spatially dependent backscatter that is variable in time and in different azimuth angles;
    determining, in the computer, one or more thin slices of the data that are variable in time and in different azimuth angles;
    determining, in the computer, a collocation of the one or more data slices, that are variable in time and in different azimuth angles, at each of one or more grid cell centers to obtain one or more ensembles of collocated data slices;
    decomposing, in the computer, the collocated data slices into a mean part, and a fluctuating part that is variable in time and in different azimuth angles;
    reconstructing, in the computer, the data at a second resolution from the mean part and a residue of the fluctuating part;
    determining, in the computer, a wind measurement from the data at the second resolution using a wind model function; and
    outputting, from the computer, a description of the wind measurement.

2. The computer implemented method of claim 1, wherein the data at the first resolution is collected from a QuikSCAT scatterometer mission over a ten-year period of time.

3. The computer implemented method of claim 1, wherein the data at the first resolution is represented by a radar equation:

$$P_{Ri} = \frac{P_{Ti}\lambda^2}{(4\pi)^3 R^4} \int\int_A dx dy G(\phi_i, x, y)\sigma_0(\phi_i, t_i, x, y)$$

wherein, $\sigma_0(\phi_i, t_i, x, y)$ comprises spatially dependent backscatter, that is variable in time and in different azimuth angles, to be decomposed into the mean part and the fluctuating part at location (x, y) measured at time $t_i$ in an azimuth direction of $\phi_i$, $G(\phi_i, x, y)$ comprises an antenna power beam, $P_{Ti}$ comprises transmitted power, $P_{Ri}$ comprises received power, $\lambda$ comprises wavelength, and R comprises a distance between the satellite and a targeted area A.

4. The computer implemented method of claim 1, wherein the decomposing of the collocated data slices is represented by:

$$\sigma_0(\phi_i, t_i, x, y) = \bar{\sigma}_0(x, y) + \epsilon(\phi_i, t_i, x, y),$$

wherein at each coordinate (x, y), backscatter $\sigma_0(\phi_i, t_i, x, y)$ at a posting $(x_k, y_k)=(0,0)$ is composed of the mean part $\bar{\sigma}_0(x, y)$, averaged over all $\phi_i$ and all $t_i$, and a zero-mean fluctuation part of $\epsilon(\phi_i, t_i, x, y)$ variable in $\phi_i$ at different time $t_i$.

5. The computer implemented method of claim 1, wherein the reconstructing the data at the second resolution from the mean part utilizes a rosette transform that is defined by:

$$\overline{\sigma}_{0M} = \frac{1}{\Gamma_A} \int \int_A dx\, dy \left[ \sum_{i=1}^{N} \frac{G(\phi_i, x, y)}{N} \right] \overline{\sigma}_0(x, y)$$

$$= \frac{1}{\Gamma_A} \int \int_A dx\, dy\, G(x, y) \overline{\sigma}_0(x, y)$$

wherein $\overline{\sigma}_{0M}$ represents the mean part at the second resolution $\Gamma_A$ defines an integrated gain-area product, $G(\phi, x, y)$ defines a Gaussian beam at an azimuth angle $\phi_i$ at point $(x, y)$, and an equivalent composite power gain is defined as:

$$G(x, y) = \sum_{i=1}^{N} \frac{G(\phi_i, x, y)}{N}.$$

6. An apparatus for measuring wind in a computer system comprising:
(a) a computer having a memory;
(b) an application executing on the computer, wherein the application is configured to:
(i) obtain data at a first resolution collected by a satellite scatterometer wherein the data comprises spatially dependent backscatter that is variable in time and in different azimuth angles;
(ii) determine one or more thin slices of the data that are variable in time and in different azimuth angles;
determining a collocation of the one or more data slices, that are variable in time and in different azimuth angles, at each of one or more grid cell centers to obtain one or more ensembles of collocated data slices;
(iii) decompose the collocated data slices into a mean part and a fluctuating part;
(iv) reconstruct the data at a second resolution from the mean part and a residue of the fluctuating part;
(v) determine a wind measurement from the data at the second resolution using a wind model function; and
(vi) output a description of the wind measurement.

7. The apparatus of claim 6, wherein the data at the first resolution is collected from a QuikSCAT scatterometer mission over a ten-year period of time.

8. The apparatus of claim 6, wherein the data at the first resolution is represented by a radar equation:

$$P_{Ri} = \frac{P_{Ti}\lambda^2}{(4\pi)^3 R^4} \int \int_A dx\, dy\, G(\phi_i, x, y)\sigma_0(\phi_i, t_i, x, y)$$

wherein, $\sigma_0(\phi_i, t_i, x, y)$ comprises spatially dependent backscatter that is variable in time and in different azimuth angles, to be decomposed into the mean part and the fluctuating part at location $(x, y)$ measured at time $t_i$ in an azimuth direction of $\phi_i$, $G\phi_i, x, y)$ comprises an antenna power beam, $P_{Ti}$ comprises transmitted power, $P_{Ri}$ comprises received power, $\lambda$ comprises wavelength, and R comprises a distance between the satellite and a targeted area A.

9. The apparatus of claim 6, wherein the application is configured to decompose the collocated data slices based on an equation:

$$\sigma_0(\phi_i, t_i, x, y) = \overline{\sigma}_0(x, y) + \epsilon(\phi_i, t_i, x, y),$$

wherein at each coordinate $(x, y)$, backscatter $\sigma_0(\phi_i, t_i, x, y)$ at a posting $(x_k, y_k) = (0,0)$ is composed of the mean part $\overline{\sigma}_0(x, y)$ averaged over all $\phi_i$ and all $t_i$, and a zero-mean fluctuation part of $\epsilon(\phi_i, t_i, x, y)$ variable in $\phi_i$ at different time $t_i$.

10. The apparatus of claim 6, wherein the application is configured to reconstruct the data at the second resolution from the mean part utilizing a rosette transform that is defined by $$\overline{\sigma}_{0M} = \frac{1}{\Gamma_A} \int \int_A dx\, dy \left[ \sum_{i=1}^{N} \frac{G(\phi_i, x, y)}{N} \right] \overline{\sigma}_0(x, y)$$

$$= \frac{1}{\Gamma_A} \int \int_A dx\, dy\, G(x, y) \overline{\sigma}_0(x, y)$$

wherein $\overline{\sigma}_{0M}$ represents the mean part at the second resolution $\Gamma_A$ defines an integrated gain-area product, $G(\phi, x, y)$ defines a Gaussian beam at an azimuth angle $\phi_i$ at point $(x, y)$, and an equivalent composite power gain is defined as:

$$G(x, y) = \sum_{i=1}^{N} \frac{G(\phi_i, x, y)}{N}.$$

11. A non-transitory computer readable storage medium encoded with computer program instructions which when accessed by a computer cause the computer to load the program instructions to a memory therein creating a special purpose data structure causing the computer to operate as a specially programmed computer, executing a method of measuring wind, comprising:
(a) obtaining, in the specially programmed computer, data at a first resolution collected by a satellite scatterometer wherein the data comprises backscatter that is variable in time and in different azimuth angles;
(b) determining, in the specially programmed computer, one or more thin slices of the data that are variable in time and in different azimuth angles;
(c) determining, in the specially programmed computer, a collocation of the one or more data slices, that are variable in time and in different azimuth angles, at each of one or more grid cell centers to obtain one or more ensembles of collocated data slices;
(d) decomposing, in the specially programmed computer, the collocated data slices into a mean part and a fluctuating part that is variable in time and in different azimuth angles;
(e) reconstructing, in the specially programmed computer, the data at a second resolution from the mean part and a residue of the fluctuating part;
(f) determining, in the specially programmed computer, a wind measurement from the data at the second resolution using a wind model function; and
(g) outputting, in the specially programmed computer, a description of the wind measurement.

12. The non-transitory computer readable storage medium of claim 11, wherein the data at the first resolution is collected from a QuikSCAT scatterometer mission over a ten-year period of time.

13. The non-transitory computer readable storage medium of claim 11, wherein the data at the first resolution is represented by a radar equation:

$$P_{Ri} = \frac{P_{Ti}\lambda^2}{(4\pi)^3 R^4} \int\int_A dx\, dy\, G(\phi_i, x, y) \sigma_0(\phi_i, t_i, x, y)$$

wherein, $\sigma_0(\phi_i, t_i, x, y)$ comprises spatially dependent backscatter that is variable in time and in different azimuth angles, to be decomposed into the mean part and the fluctuating part at location (x, y) measured at time $t_i$ in an azimuth direction of $\phi_i$, $G(\phi_i, x, y)$ comprises an antenna power beam, $P_{Ti}$ comprises transmitted power, $P_{Ri}$ comprises received power, $\lambda$ comprises wavelength, and R comprises a distance between the satellite and a targeted area A.

14. The non-transitory computer readable storage medium of claim 11, wherein the decomposing of the collocated data slices is represented by:

$$\sigma_0(\phi_i, t_i, x, y) = \bar{\sigma}_0(x, y) + \epsilon(\phi_i, t_i, x, y),$$

wherein at each coordinate (x, y), backscatter $\sigma_0(\phi_i, t_i, x, y)$ at a posting $(x_k, y_k)=(0,0)$ is composed of the mean part $\bar{\sigma}_0(x, y)$, averaged over all $\phi_i$ and all $t_i$, and a zero-mean fluctuation part of $\epsilon(\phi_i, t_i, x, y)$ variable in $\phi_i$ at different time $t_i$.

15. The non-transitory computer readable storage medium of claim 11, wherein reconstructing the data at the second resolution from the mean part utilizes a rosette transform that is defined by:

$$\bar{\sigma}_{0M} = \frac{1}{\Gamma_A} \int\int_A dx\, dy \left[\sum_{i=1}^{N} \frac{G(\phi_i, x, y)}{N}\right] \bar{\sigma}_0(x, y)$$

$$= \frac{1}{\Gamma_A} \int\int_A dx\, dy\, G(x, y) \bar{\sigma}_0(x, y)$$

wherein $\bar{\sigma}_{0M}$ represents the mean part at the second resolution, $\Gamma_A$ defines an integrated gain-area product, $G(\phi_i, x, y)$ defines a Gaussian beam at an azimuth angle $\phi_i$ at point (x, y), and an equivalent composite power gain is defined as:

$$G(x, y) = \sum_{i=1}^{N} \frac{G(\phi_i, x, y)}{N}.$$

* * * * *